US011964538B2

(12) United States Patent
Fraas et al.

(10) Patent No.: US 11,964,538 B2
(45) Date of Patent: Apr. 23, 2024

(54) VENTILATION DEVICE

(71) Applicant: Mahle International GmbH, Stuttgart (DE)

(72) Inventors: Marc Fraas, Bietgheim-Bissingen (DE); Holger Laux, Dietingen (DE); Thorsten Moellert, Stuttgart (DE); Walter Wolf, Oppenweiler-Zell (DE)

(73) Assignee: Mahle International GmbH (DE)

( * ) Notice: Subject to any disclaimer, the term of this patent is extended or adjusted under 35 U.S.C. 154(b) by 676 days.

(21) Appl. No.: 17/120,110

(22) Filed: Dec. 12, 2020

(65) Prior Publication Data

US 2021/0178857 A1 Jun. 17, 2021

(30) Foreign Application Priority Data

Dec. 13, 2019 (DE) .......................... 102019219543.1

(51) Int. Cl.
*B60H 1/00* (2006.01)
(52) U.S. Cl.
CPC ..... *B60H 1/00857* (2013.01); *B60H 1/00678* (2013.01); *B60H 2001/00707* (2013.01)
(58) Field of Classification Search
CPC .. B60H 1/00692; B60H 1/00664; B60H 1/24; B60H 2001/00721; B60H 1/00857

(Continued)

(56) References Cited

U.S. PATENT DOCUMENTS 3,948,312 A 4/1976 Nisbet
6,450,246 B1 * 9/2002 Kurokawa ......... B60H 1/00692
165/42

(Continued)

FOREIGN PATENT DOCUMENTS

DE 602005001241 T2 1/2008
DE 102018117968 A1 1/2019

(Continued)

OTHER PUBLICATIONS

Chinese Office Action dated Jul. 22, 2023 and Search Report dated Jul. 19, 2023 for Chinese Patent Application No. 202011460916.7.

Primary Examiner — Ko-Wei Lin
(74) Attorney, Agent, or Firm — Fishman Stewart PLLC

(57) ABSTRACT

A ventilation device may include first and second supply ducts, a mixing section having a mixing duct into which the first and second supply ducts may lead, the first and second supply ducts arranged in the mixing section adjacent one another in a transverse direction, and first and second guides in the mixing section each running in the transverse direction and being located opposite one another in a longitudinal direction running transversely to the transverse direction, each guide having two guide walls running in the transverse direction and located opposite one another in a height direction running transversely to the transverse direction and longitudinal direction, at least one of the guide walls sloping away from the other guide wall at a slope angle with respect to the longitudinal direction. A valve may have a plate body and may be adjustably guided with a first guide section running in the transverse direction in the first guide and with a second guide section running in the transverse direction in the second guide. An actuator may during operation adjust the valve in the transverse direction between a first position, in which the valve fluidically separates the second supply duct from the mixing duct and opens a fluidic connection between the first supply duct and the mixing duct, and a second position, in which the valve fluidically separates the first supply duct from the mixing duct and opens a fluidic connection between the second supply duct and the mixing duct, wherein the first guide section has a first thickness running in the height direction and which is smaller than a second thickness of the second guide section running in the (Continued)

height direction in such a manner that both guide sections are each in contact with both guide walls of the associated guide.

20 Claims, 5 Drawing Sheets

(58) Field of Classification Search
USPC .................................. 454/108–109, 152, 155
See application file for complete search history.

(56) References Cited

U.S. PATENT DOCUMENTS

| | | | |
|---|---|---|---|
| 6,547,152 | B1 | 4/2003 | Pawlak, III |
| 6,688,964 | B2 * | 2/2004 | Uemura ............. B60H 1/00692 454/121 |
| 7,582,009 | B1 | 9/2009 | Cote |
| 9,844,994 | B2 | 12/2017 | Byon et al. |
| 2006/0042778 | A1 | 3/2006 | Stevenson |
| 2009/0313899 | A1 * | 12/2009 | Tokunaga .......... B60H 1/00692 49/40 |
| 2012/0034859 | A1 | 2/2012 | Meehan et al. |
| 2013/0152619 | A1 * | 6/2013 | Ito ........................ B60H 1/0005 62/408 |
| 2013/0260663 | A1 * | 10/2013 | Kaiyama ............ B60H 1/00692 454/155 |
| 2015/0118948 | A1 * | 4/2015 | Nakao ................ B60H 1/00692 454/152 |
| 2016/0001630 | A1 * | 1/2016 | Nakao ................ B60H 1/00692 236/13 |
| 2016/0236535 | A1 * | 8/2016 | Kuwayama ........ B60H 1/00678 |
| 2016/0263963 | A1 * | 9/2016 | Sato ........................ F24F 13/12 |
| 2019/0315191 | A1 * | 10/2019 | Kang ................. B60H 1/00857 |

FOREIGN PATENT DOCUMENTS

| | | |
|---|---|---|
| DE | 102017122737 A1 | 4/2019 |
| EP | 0475034 A1 | 3/1992 |
| GB | 2345534 | 7/2000 |
| JP | H10324140 A | 12/1998 |
| KR | 20100091660 A | 8/2010 |
| KR | 20120093768 A | 8/2012 |
| KR | 20140055248 A | 5/2014 |

* cited by examiner

VENTILATION DEVICE

CROSS-REFERENCE TO RELATED APPLICATIONS

This application claims priority to German Patent Application No. DE 10 2019 219 543.1, filed on Dec. 13, 2019, the contents of which is hereby incorporated by reference in its entirety.

TECHNICAL FIELD

The present invention relates to a ventilation device, in particular to an air conditioning system, for a motor vehicle, comprising two supply ducts, from which air is mixed into a mixing duct or in which air from a mixing duct flows.

BACKGROUND

Generally, a ventilation device serves for ventilating a space, in particular in a motor vehicle. In particular when the ventilation device is part of an air conditioning system or is formed as air conditioning system, the supply of air of different temperature into the space takes place with such a ventilation device. For this purpose, such ventilation devices usually comprise two supply ducts, through which air of different temperature flows in a flow direction in each case. For this purpose, a heating device for heating the air can be arranged for example in one of the supply ducts and the other supply duct be conducted past the heating device. The supply of air with the desired temperature to suit requirement can take place in particular in that air originating from the supply ducts is conducted into a mixing duct arranged downstream of the supply ducts. For adjusting the volume flows from the respective supply duct into the mixing duct, a valve element can be basically provided, which opens and blocks the fluidic connection between the respective supply duct and the mixing duct.

SUMMARY

The present invention deals with the object of stating an improved or at least other embodiment for a ventilation device of the type mentioned at the outset, which is characterized in particular by a cost-effective production and robust function at the same time.

According to the invention, this problem is solved through the subject matter of the independent claim(s). Advantageous embodiments are the subject matter of the dependent claim(s).

The present invention is based on the general idea of adjusting, in a ventilation device having two supply ducts and a mixing duct arranged downstream or upstream of the supply ducts, a valve element for the optional fluidic connection of the respective supply duct to the mixing duct, through a translational movement along two guides. Here, the manufacturing-based geometrical profiles of the guides are balanced by suitably adapting the design of the valve element. Thus, the components comprising the guides can be cost-effectively produced in particular by way of a moulding method, for example by way of an injection moulding method, such as for example through a plastic injection moulding method. At the same time, a robust function of the ventilation device, in particular a reliable adjusting of the valve element and/or the prevention or at least reduction of undesirable leakages is achieved.

According to the inventive idea, the ventilation device comprises the two supply ducts, which in the following are also referred to as first supply duct and second supply duct. The supply ducts are fluidically separated from one another for example by a common wall. During the operation, the respective supply duct is flowed through in a flow direction. The ventilation device comprises a mixing section in which the supply ducts are connected to the mixing duct. Here, the mixing duct can be arranged downstream or upstream of the supply ducts. The supply ducts are arranged, adjacent in a transverse direction, at least in the mixing section, wherein the transverse direction practically runs transversely to the flow direction. In the mixing section, two guides running in the transverse direction and located opposite in a longitudinal direction running transversely to the transverse direction are provided, in which the valve element is guided, wherein these guides in the following are also referred to as first guide and second guide. The respective guide two guide walls running in the transverse direction and which are located opposite in a height direction running transversely to the transverse direction and transversely to the longitudinal direction, wherein at least one of the guide walls of the respective guide, in particular due to the production, slopes away from the other guide wall at a slope angle with respect to the longitudinal direction. The valve element comprises a plate body. Here, the valve element, in particular the plate body, is guided with a guide section each in one of the guides. This means that the valve element with a first guide section running in the transverse direction is adjustable in each case in the first guide and with a second guide section running in the transverse direction, spaced apart from the first guide section in the longitudinal direction, in the second guide, in each case in the transverse direction. An actuator of the ventilation device adjusts the valve element during the operation in the transverse direction and thus translationally, in order to establish or separate a fluidic connection between the mixing duct and optionally the first supply duct and/or the second supply duct. By adjusting the valve element with the actuator, the adjusting of a portion of volume flow from the respective supply duct into the mixing duct thus takes place during the operation. In the process, the actuator adjusts the valve element between a first position and a second position. In the first position, the valve element fluidically separates the second supply duct from the mixing duct and opens, in particular maximally, a fluidic connection between the first duct and the mixing duct. In the second position, the valve element separates a fluidic connection between the first supply duct and the mixing duct and opens a fluidic connection between the second supply duct and the mixing duct, in particular maximally. There it is provided that the first guide section and the second guide section of the valve element have different thicknesses running in the height direction in such a manner that both guide sections are each in contact with both guide walls of the associated guide. In other words, the first guide section has a first thickness running in the height direction which is smaller than a second thickness of the second guide section running in the height direction, wherein the thicknesses of the guide sections are such that both guide sections are in contact with both guide walls of the respective associated guide. As a consequence, the ventilation device is cost-effectively produced and has a robust and/or reliable function at the same time.

Within the guide walls, a minor play is present in order to compensate for manufacturing-related shape tolerances and/or position tolerances and make possible a smooth movement of the valve element.

The different thicknesses of the guide sections arise from demoulding bevels during the moulding method due to the production, in particular during the injection moulding. By shaping the edges of the valve elements, the same, dependent on the flow direction and/or installation direction, can be moved smoothly. By utilising the self-reinforcing effect from the air velocity and pressure drop, at least the downstream-directed region of the edges of the valve element and of the guide device can each be sealingly pressed against one another.

Air with different temperature can flow through the supply ducts. For example, air with a colder temperature can flow through the first supply duct than in the second supply duct or vice versa. Thus, by adjusting the valve element, a desired temperature of the air in the mixing duct can be adjusted in the mixing section. For this purpose, the valve element can be arranged at the inlet or at the outlet of the two supply ducts.

Here, the sloping course of at least one of the guide walls means in particular that the sloping guide wall does not run parallel to the longitudinal direction.

Preferentially, the valve element has a plate-like basic shape. This is practically realised by the plate body. This results in a simplified production of the valve element and a simple as well as precise realisation of the different thicknesses in the guide sections.

Generally, merely one of the guide walls of the respective guide can slope away from the guide wall located opposite in the height direction. In particular, at least one of the guide walls can run at a slope or angle relative to the longitudinal direction.

Practically, both guide walls of the respective guide located opposite in the height direction slope away from one another with respect to the longitudinal direction.

Practically, both guide walls of the respective guide located opposite in the height direction slope away from one another with respect to the longitudinal direction. Thus it is possible to cost-effectively produce the respective guide and consequently the components of the ventilation device comprising the respective guide. In particular during a production of the said components in a moulding method, in particular injection moulding method, the components can thus be cost-effectively produced since for example undercuts and the like are not required or at least reduced. In addition, the relevant moulding tools can be more easily removed from the component so that in particular downstream processing steps can be done without or are at least reduced.

Generally, the ventilation device can be employed in any application. The ventilation device can be in particular part of an air conditioning system or formed as an air conditioning system. Here, the ventilation device is employed for example in a motor vehicle in order to ventilate, air-condition a space within the motor vehicle, for example a vehicle interior.

Preferred are embodiments, in which the ventilation device comprises a further mixing duct which is fluidically connected with the two supply ducts, wherein an associated further valve element optionally blocks and opens the fluidic connection between the respective supply duct and the additional mixing duct, in order to adjust the portions of the volume flows from the respective supply duct into the further mixing duct, which is also referred to as additional mixing duct in the following. Thus it is possible in particular with the respective mixing duct to ventilate an associated zone within a space, in particular the vehicle interior, so that the ventilation device is configured as a two-zone ventilation device.

Preferably, the ventilation device comprises a separating wall which separates the two mixing ducts in the longitudinal direction and in the height direction from one another. This means that the mixing duct is bounded by the separating wall. Here, the second guide is formed in the separating wall. On the side of the separating wall facing away from the mixing duct the additional mixing duct is formed, which is bounded by the separating wall in the longitudinal direction and in the height direction. In the mixing section, both supply ducts open into the mixing duct and into the additional mixing duct. Here, on the side of the separating wall facing away from the mixing duct, a third guide running in the transverse direction, preferentially in the separating wall, and a fourth guide located opposite the third guide in the longitudinal direction and running in the transverse direction are provided in the mixing section. The third guide and the fourth guide each also comprise two guide walls running in the transverse direction and located opposite in the height direction, wherein at least one of the guide walls of the third guide and of the fourth guide slopes away from the other guide wall at a slope angle with respect to the longitudinal direction. In particular, both guide walls of the third guide and of the fourth guide located opposite in the height direction slope away from the other guide wall at a slope angle. The valve element associated with the additional mixing duct, in the following called additional valve element, is preferentially formed substantially plate-like and comprises a plate body. The additional valve element, in particular the plate body is guided, analogously to the valve element, with respective associated guide sections in the third guide and in the fourth guide. This means that the additional valve element is guided with a first guide section running in the transverse direction in the first guide and with a second guide section spaced apart from the first guide section in the longitudinal direction running in the transverse direction, in the third guide, in each case adjustably in the transverse direction. The actuator of the ventilation device is configured in such a manner that it also adjusts the additional valve element in the transverse direction in order to optionally open and block a fluidic connection between the respective supply duct and the additional mixing duct. This means that the actuator during the operation adjusts the additional valve element, analogously to the valve element of the mixing duct, in the transverse direction between a first position and a second position, wherein the additional valve element in the first position fluidically separates the second supply duct from the additional mixing duct and opens a fluidic connection between the first supply duct and the additional mixing duct, and wherein the additional valve element in the second position fluidically separates the first supply duct from the additional mixing duct and opens a fluidic connection between the second supply duct and the additional mixing duct. Furthermore, the guide sections of the additional valve element are different with respect to their thicknesses, so that both guide sections are in contact with both guide walls of the associated guide. In particular, the first guide section has a first thickness that is smaller than a second thickness of the second guide section. As a consequence, the additional valve element is also configured so as to be robustly and reliably adjustable and/or undesirable leakages are prevented or at least reduced.

Advantageous are embodiments, in which the mixing duct and the additional mixing duct have the same flow cross section, in particular the same dimensions, in the region of the mixing section. In this way it is more easily possible to adjust the portions of the volume flows from the respective supply duct into the respective mixing duct so that the operation of the ventilation device can take place in a simplified manner. In addition, the components of the ventilation device can thus be produced more easily and cost-effectively so that the ventilation device as a whole is realised cost-effectively and with a robust function at the same time.

In advantageous embodiments, the mixing duct is bounded by the separating wall and a first assembly that is separate from the separating wall, on which the separating wall is mounted. The first assembly comprises two longitudinal walls located opposite in the transverse direction and a transverse wall located opposite the separating wall in the longitudinal direction, in which advantageously the second guide is formed. Thus, the ventilation device can be easily and cost-effectively mounted and thus produced. In particular, the first assembly is produced by way of a moulding method, in particular by an injection moulding method.

It is preferred when the additional mixing duct is bounded by the separating wall and a second assembly that is separate from the separating wall, which is mounted on the separating wall. The second assembly comprises two longitudinal walls located opposite in the transverse direction and a transverse wall located opposite the separating wall in the longitudinal direction, wherein the fourth guide is advantageously formed in the transverse wall. In particular, the second assembly is produced by way of a moulding method, in particular by way of an injection moulding method.

Conceivable are embodiments, in which the first assembly and the second assembly are formed and/or arranged mirror-symmetrically relative to one another.

Embodiments can also be conceived, in which the first assembly and the second assembly are identical parts. This means in particular that the first assembly and the second assembly are identical components, which, for example by way of a mirrored arrangement, in particular mirrored with respect to the separating wall, bound the mixing duct and the additional mixing duct jointly with the separating wall. In this way, an easy and cost-effective production of the ventilation device is achieved. In particular, the ventilation device can thus be easily and cost-effectively produced in a series production.

Advantageous are embodiments, in which a wall thickness of the separating wall is smaller than the corresponding wall thickness of the respective transverse wall and/or of the longitudinal walls. This makes possible an installation space-saving and cost-effective production of the ventilation device with robust function of the ventilation device at the same time.

Advantageous are embodiments, in which the valve element and the additional valve elements are designed as identical parts. Thus, the production of the ventilation device, in particular in a series production, becomes cost-effective and simplified.

The actuator can basically be configured in any way provided it adjusts the valve element and if applicable the additional valve element between the first position and the second position.

Advantageously, the actuator is configured in such a manner that it adjusts the valve element and the additional valve element independently of one another between the respective first position and second position. In this way it is possible to individually adjust the volume flows from the supply ducts in the mixing ducts. Here, the actuator advantageously comprises two actuator units, wherein one of the actuator units is assigned to the valve element and the other actuator unit to the additional valve element.

Advantageously, the actuator comprises a pinion shaft adjacent to the valve element in the height direction, i.e. a shaft having at least one pinion, which has a tooth structure. The pinion shaft is arranged adjacent to the valve element in the height direction, wherein the valve element, in particular the plate body, has a tooth structure corresponding to the tooth structure of the pinion shaft on the face end facing the pinion shaft in the height direction, which in the following is also referred to as mating tooth structure, and which is in engagement with the tooth structure of the pinion shaft in such a manner that a rotation of the pinion shaft results in the valve element being adjusted along the transverse direction. Thus, a reliable and robust adjusting of the valve element between the first position and the second position is achieved.

It is preferred when the actuator comprises a pinion shaft that is adjacent to the additional valve element in the height direction and associated with the same, which is also referred to as additional pinion shaft in the following, having a tooth structure. The additional valve element, in particular the plate body, comprises on the face end facing the additional pinion shaft in the height direction, a tooth structure corresponding with the tooth structure of the additional pinion shaft, in the following also refer to as mating tooth structure, which is in engagement with the tooth structure of the additional pinion shaft, so that a rotation of the additional pinion shaft results in an adjusting of the additional valve element between the first position and the second position. In this way, a reliable and robust adjusting of the additional valve element between the first position and the second position is achieved.

Preferred are embodiments, in which the pinion shaft and the additional pinion shaft are designed as identical parts. This means in particular that the additional pinion shaft is the same component as the pinion shaft. This results in a cost-effective and easy production of the ventilation device. Thus, cost reductions occur in particular during the production of the ventilation device in series.

Practically, the pinion shaft and the additional pinion shaft of the actuator are decoupled rom one another in such a manner that they are rotated independently of one another during the operation in order to individually adjust the respective associated valve element. For this purpose, the actuator can comprise an associated drive for the respective pinion shaft.

Also conceivable are embodiments, in which the pinion shaft and the additional pinion shaft are non-rotatably connected to one another, so that they, coupled and jointly, adjust the valve element and the additional valve element. In this way it is possible in particular to convert the basically two-zone ventilation device into a single-zone ventilation device in a simple and cost-effective manner, in particular in series production.

It is likewise conceivable to realise a three-zone, four-zone or multi-zone ventilation device by providing further assemblies.

The respective pinion shaft can basically comprise a single pinion which is in engagement with the mating tooth structure of the associated valve element.

Advantageous are embodiments, in which at least one of the pinion shafts, i.e. the pinion shaft and/or the additional pinion shaft, comprises two pinions spaced apart in the longitudinal direction, which jointly form the tooth structure of the pinion shaft. The associated valve element comprises associated teeth for the respective pinion, which follow one another in the transverse direction and are in engagement with the respective associated pinion. Here, the teeth of the valve element can be configured in such a manner that they extend in the longitudinal direction in such a manner that in each case they are in engagement with both pinions of the associated pinion shaft. Alternatively it is conceivable to provide the valve element with at least two tooth rows spaced apart from one another in the longitudinal direction, wherein the respective tooth row is in engagement with one of the pinions of the associated pinion shaft. The respective tooth row is formed in particular in the manner of an arc. This makes possible a simplified production of the valve element and/or results in an increased mechanical stability and in a reliable adjusting of the valve element.

Preferred are embodiments, in which the mating tooth structure extends in the longitudinal direction into at least one of the guide sections, advantageously into both guide sections. This means in particular that the mating tooth structure is also arranged within the guides. This results in a smooth adjustment of the valve element and makes possible a reduced play within the guide.

The respective pinion shaft can be arranged in the height direction or in the flow direction of the air on any side of the associated valve element. This means that the respective pinion shaft can be arranged in the flow direction downstream or upstream of the associated valve element. Preferably, the pinion shaft is arranged in the region of the separation between the supply ducts, i.e. adjacent in particular in the region of the middle wall and neighbouring to the middle wall.

In advantageous embodiments, at least one of the valve elements, i.e. the valve element and/or the additional valve element, comprises on its, in the longitudinal direction, end-side edge, i.e. in particular on at least one of the guide sections, a shoulder projecting in the longitudinal direction, which extends in the transverse direction and thus runs in the transverse direction. When the valve element is subjected to flow from the supply ducts, the shoulder is pressed against one of the guide walls, so that the valve element is sealed additionally or in an improved manner regarding relevant leakages.

It is conceivable to provide two such shoulders on at least one of the in the longitudinal direction end-side edges, in particular on at least one of the guide sections, which shoulders are arranged located opposite one another in the height direction, wherein the respective shoulder lies against one of the associated guide walls. Thus, the sealing effect achieved by the valve element being subjected to the inflow is improved.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically.

DETAILED DESCRIPTION

Figure 1:
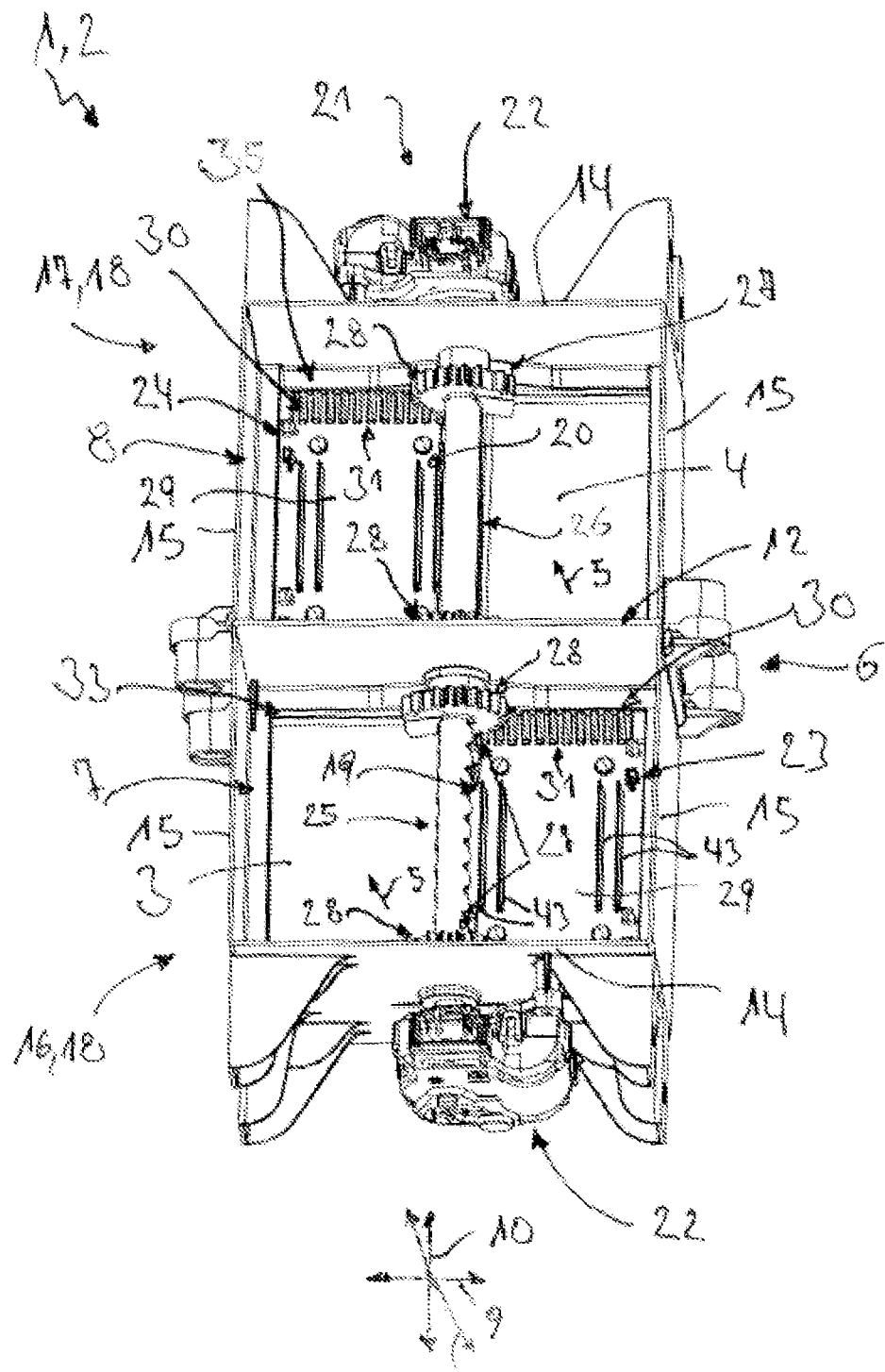
FIG. 1 shows an isometric view of a ventilation device.

A ventilation device 1, such as is shown for example in the FIGS. 1 to 5, is generally part of an air conditioning system 2. The ventilation device 1 comprises two supply ducts 3, 4, namely a first supply duct 3 and a second supply duct 4. During the operation, the supply ducts 3, 4 are each flowed through by air in a flow direction 5. In a mixing section 6, the supply ducts 3, 4 merge into two mixing ducts 7, 8, namely a mixing duct 7 and an additional mixing duct 8. This means that the supply ducts 3, 4 in the mixing section 6 each lead into the mixing duct 7 and the additional mixing duct 8. Thus, the mixing section 6 is arranged with respect to the flow direction 5 on the downstream side of the supply ducts 3, 4. At least in the region of the mixing section 6, the supply ducts 3, 4 are adjacent in a transverse direction 9, which practically runs transversely to the flow direction 5 in the mixing section 6. The mixing duct 7 and the additional mixing duct 8 are arranged adjacently at least in the mixing section 6 in a longitudinal direction 10 running transversely to the transverse direction 9. Here, the supply ducts 3, 4 are fluidically separated from one another by a middle wall 11 extending in the longitudinal direction 10. In the shown examples, the mixing duct 7 and the additional mixing duct 8 are bounded by a common separating wall 12 in the longitudinal direction 10, wherein the separating wall 12 additionally extends transversely to the longitudinal direction 10 and transversely to the height direction 13 running in the transverse direction 9, which practically runs along the flow direction 5. The mixing duct 7 and the additional mixing duct 8 are thus adjacent in the longitudinal direction 10, separated from one another by the separating wall 12 and additionally extend in the height direction 13.

Furthermore, the respective mixing duct 7, 8 is bounded by a transverse wall 14 located opposite the separating wall 12 in the longitudinal direction 10 and two longitudinal walls 15 following the separating wall 12 in the longitudinal direction 10 and located opposite in the transverse direction 9. In the shown examples, the longitudinal walls 15 and transverse wall 14 bounding the additional duct 7 are part of a first assembly 16 which is separate from the separating wall 12. In addition, the longitudinal walls 15 and transverse wall 14 bounding the additional mixing duct 8 are part of a second assembly 17 that is separate from the separating wall 12. Here, the first assembly 16 and the second assembly 17 can be designed as identical parts 18. Likewise, the assemblies 16, 17 can be formed mirror-symmetrically in an exemplary embodiment which is not shown. Thus, the first assembly 16 and the second assembly 17 are identical and, in the shown examples, arranged symmetrically with respect to the separating wall 12. Thus, the mixing duct 7 and the additional mixing duct 8 are substantially identical with respect to their dimensions, in particular in the transverse direction 9 and in the longitudinal direction 10. In the shown examples, the separating wall 12 is designed mirror-symmetrically with respect to a plane defined by the height direction 13 and the transverse direction 9.

For the respective mixing duct 7, 8, an associated valve element 19, 20 is provided. This means that for the mixing duct 7 a valve element 19 and for the additional mixing duct 8 an additional valve element 20 is provided. With the respective valve element 19, 20, the associated mixing duct 7, 8 can be optionally fluidically connected to the respective supply duct 3, 4 or separated from the same. In the process, the respective valve element 19, 20 is translationally adjusted in the transverse direction 9 with the help of an actuator 21 of the ventilation device 1. In the shown examples, the actuator 21 comprises an associated drive 22 for the respective valve element 19, 20, so that the valve elements 19, 20 can be adjusted individually and independently of one another.

Here, the respective valve element 19, 20 is adjustable in the transverse direction 9 between a first position 23 and a second position 24, wherein the respective valve element 19, 20 establishes in a first position 23 a fluidic connection between the associated mixing duct 7, 8 and the first supply duct 3, in particular maximally opens the same and blocks a fluidic connection between the associated mixing duct 7, 8 and the second supply duct 4. In the second position 24, the respective valve element 19, 20 blocks a fluidic connection of the associated mixing duct 7, 8 with the first supply duct 3 and opens a fluidic connection of the associated mixing duct 7, 8 with the second supply duct 4, in particular maximally. In the process, the first valve element 19 is shown in FIG. 1 in the first position 23 and the second valve element 20 in the second position 24.

In the shown examples, the actuator 21 comprises for the respective valve element 19, 20 an associated pinion shaft 25, 26. This means that the actuator 21 for the valve element 19 of the mixing duct 7 comprises a pinion shaft 25 and for the additional valve element 20 of the additional mixing duct 8 an additional pinion shaft 26. The respective pinion shaft 25, 26 is arranged adjacent to the associated valve element 19, 20 in the height direction 13. In the shown examples, the respective pinion shaft 25, 26 is arranged downstream of the associated valve element 19, 20. The respective pinion shaft 25, 26 has a tooth structure 27, which in the shown examples is formed by two pinions 28 spaced apart from one another in the longitudinal direction 10. The respective valve element 19, 20 comprises on the face end 29 facing the associated pinion shaft 25, 26 in the height direction 13, a structure 30 corresponding to the tooth structure 27 of the associated pinion shaft 25, 26, in the following also referred to as mating tooth structure 30, which is in engagement with the tooth structure 27 of the associated pinion shaft 25, 26 so that upon a rotation of the associated pinion shaft 25, 26 the valve element 19, 20 associated with the pinion shaft 25, 26 is adjusted in the transverse direction 9 between the first position 23 and the second position 24. In the shown examples, the respective valve element 19, 20 comprises for the respective pinion 28 a tooth row 31 running in the transverse direction 9, i.e. altogether two tooth rows 31 spaced apart in the longitudinal direction 10, which form the mating tooth structure 30 of the valve element 19, 20. The pinion shafts 25, 26 are each rotatably mounted in the separating wall 12 and the associated transverse wall 14. Here, the respective pinion shaft 25, 26 is driven by an associated drive 22 of the actuator 21, which is arranged on the side of the associated transverse wall 14 facing away from the pinion shaft 25, 26.

Figure 2:
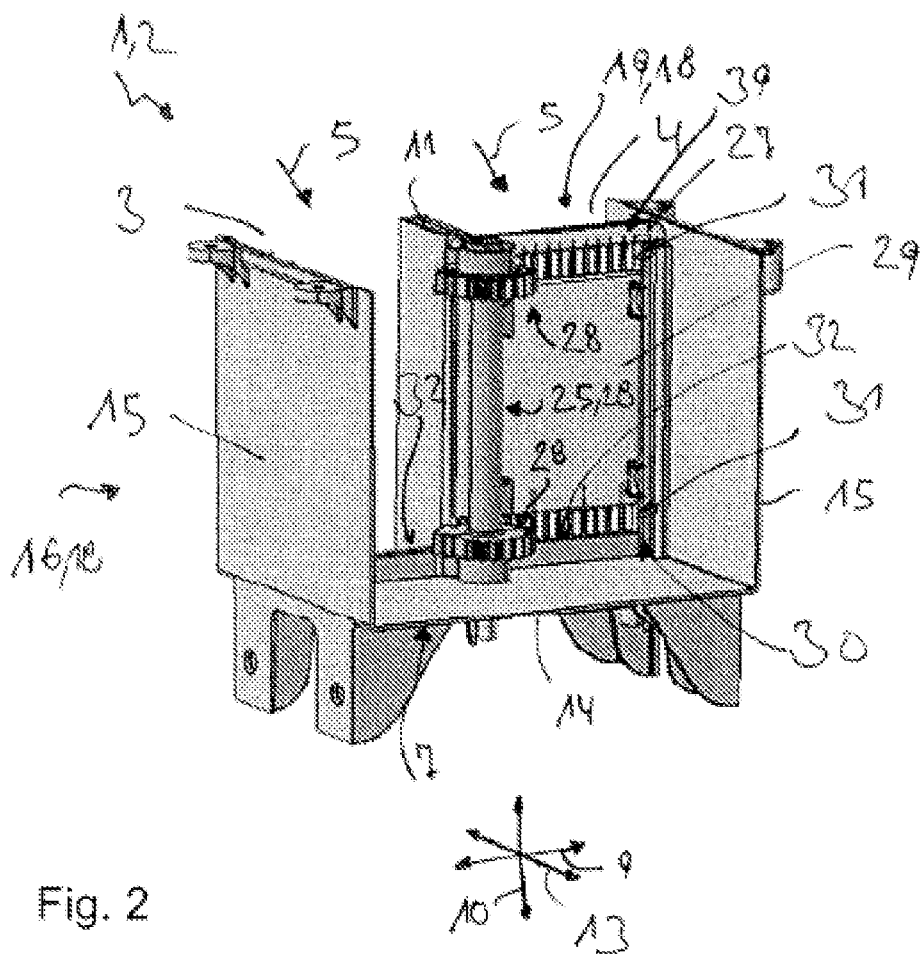
FIG. 2 shows an isometric view of a part of the ventilation device in another exemplary embodiment.
Figure 3:
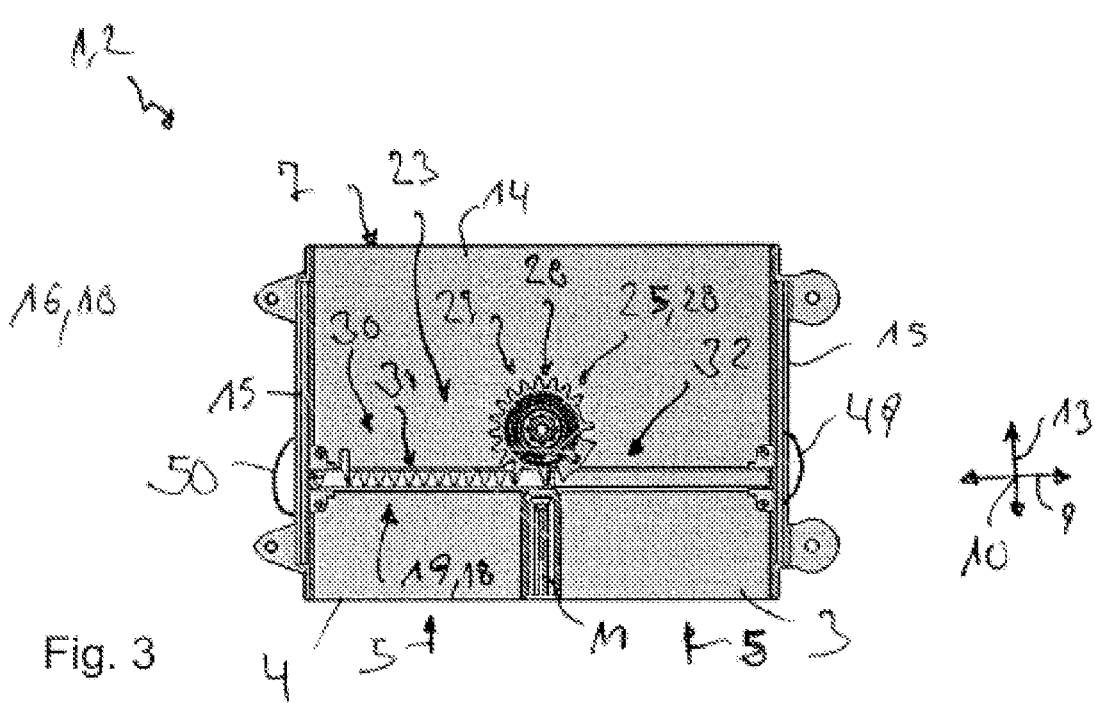
FIG. 3 shows a section through the ventilation device from FIG. 2.
Figure 5:
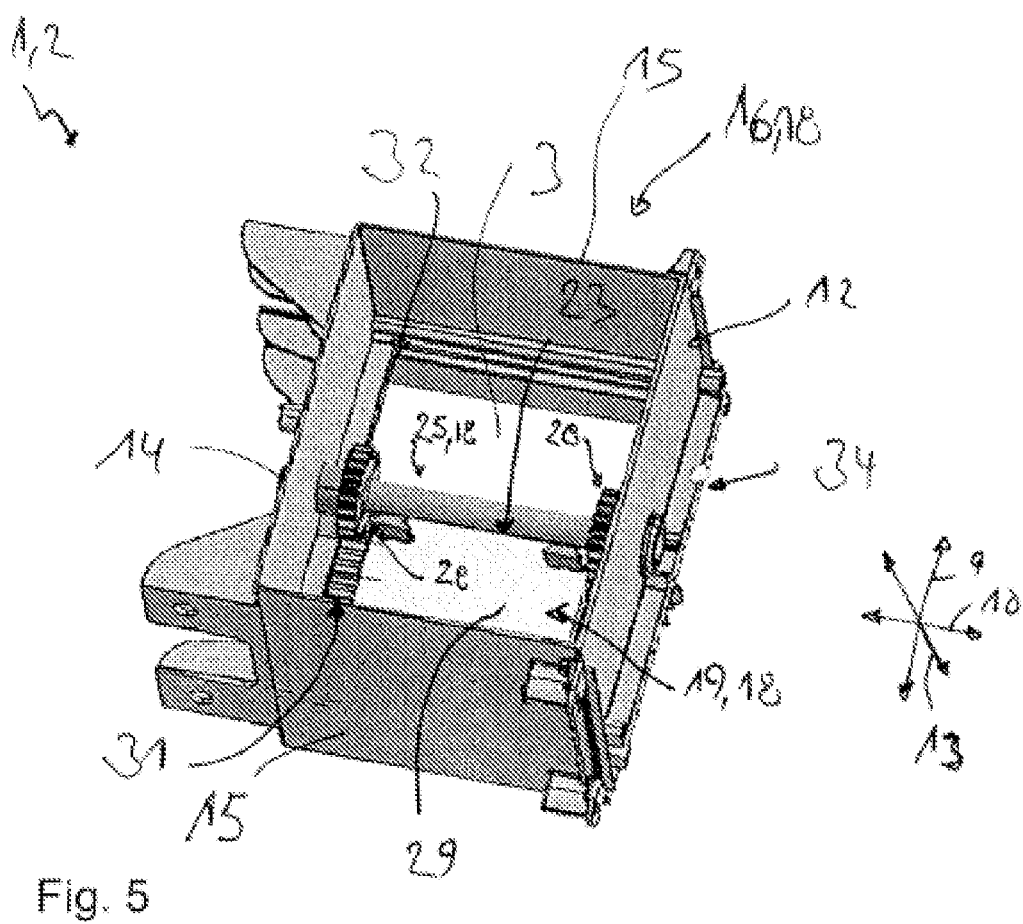
FIG. 5 shows an isometric view of a part of the ventilation device.

FIG. 2 shows a view of the ventilation device 1 in the region of the mixing duct 7 without separating wall 12 and without drive 22. FIG. 3 shows a section through the ventilation device 1 in the transverse direction 9 and along the separating wall 12 and thus on the mixing duct 7. FIG. 5 shows an isometric view of the ventilation device 1 in the region of the mixing duct 7. Optionally, FIG. 5 can be part of the ventilation device 1 shown in FIG. 1 or an alternative exemplary embodiment of the ventilation device 1, in which the ventilation device 1 merely comprises the mixing duct 7, however no additional mixing duct 8.

As is evident from the FIGS. 1 to 5, the respective valve element 19, 20 is guided in guides 32, 33, 34, 35 extending in the transverse direction 9 and located opposite in the longitudinal direction 10. In other words, the valve element 19 of the mixing duct 7 is guided in a first guide 32 which in the shown examples is formed in the transverse wall 14 of the first assembly 16. In addition, the valve element 19 is guided in a second guide 33, which in the shown examples is formed in the separating wall 12. The additional valve element 20 is guided in a third guide 34 formed in the shown examples in the separating wall 12 and a fourth guide 35 formed in the shown examples in the transverse wall 14 of the second assembly 17.

Figure 4:
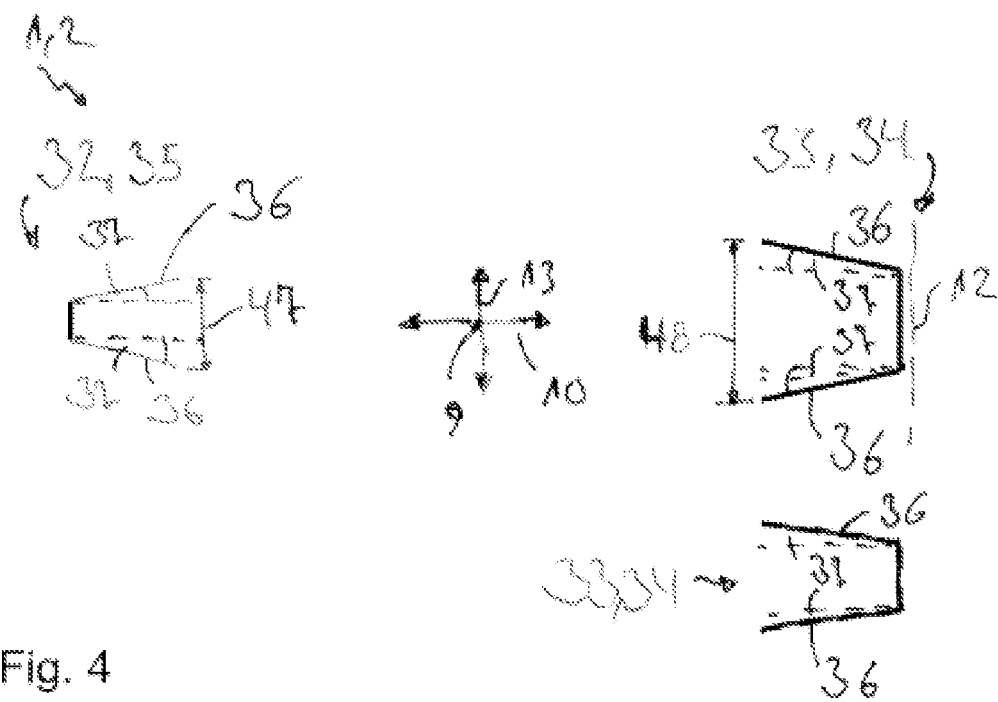
FIG. 4 shows a section through a part of the ventilation device.

FIG. 4 shows a symbolic view of two of the guides 32, 33, 34, 35 located opposite one another in the longitudinal direction 10, i.e. the first guide 32 and the second guide 33, the third guide 34 and the fourth guide 35 respectively. As is evident in particular from FIG. 4, the respective guide 32, 33, 34, 35 comprises two guide walls 36 located opposite in the height direction 13 and running in the transverse direction 9. Here, at least one of the guide walls 36 slopes away from the guide wall 36 located opposite in the height direction 13 at a slope angle 37 with respect to the longitudinal direction 10. In the shown example, both guide walls 36 located opposite in the height direction 13 slope away from one another with the same slope angle 37. Here, the slope angles 37 are each the same. As is shown in FIG. 4 in the bottom right region it is also conceivable that the guide walls 36 of one of the guides 32, 33, 34, 35 slope away from the guide wall 36 located opposite in the height direction 13 with another slope angle 37. As is evident from FIG. 4, the guide walls 36 of the guides 32, 33, 34, 35 that are distant from the separating wall 12 indicated in FIG. 4, here the first guide 32 and the fourth guide 35, thus have a distance 47 running in the height direction 13, in the following also referred to as first distance 47, which is smaller than a second distance 48 running in the height direction 13 between the guide walls 36 of the guides 32, 33, 34, 35 adjacent to the separating wall 12, here thus the second guide 33 and the third guide 34. In addition, the distance on the transversely running guide projections 49, 50 on the longitudinal walls 15 (see FIG. 3) continuously increases from the first distance 47 to the second distance 48.

The respective valve element 19, 20 comprises for the respective associated guide 32, 33, 34, 35 an associated guide section 38, 39. This means that the first valve element 19 for the first guide 32 comprises a first guide section 38 running in the transverse direction 9 and for the second guide 33 a second guide section 39 spaced apart from the first guide section 38 in the longitudinal direction 10 and running in the transverse direction 9, wherein the first guide section 38 is guided in the first guide 32 and the second guiding section 39 in the second guide 33. Analogous to this, the additional valve element 20 comprises a first guide section 38 and a second guide section 39 that is spaced apart in the longitudinal direction 10 from the first guide section 38, wherein the respective guide section 38, 39 runs in the transverse direction 9. The first guide section 38 of the additional valve element 20 is guided in the fourth guide 35 and the second guide section 39 of the additional valve element 20 in the third guide 34. Here, the first guide section 38 of the respective valve element 19, 20 has a first thickness 40 running in the height direction 13 that is smaller than a second thickness 41 of the second guide section 39 running in the height direction 13 (see FIGS. 6 to 8) in such a manner that the respective guide section 38, 39 is in contact with both guide walls 36 of the respective guide 32, 33, 34, 35. Thus, the difference between the first distance 47 and the distance 48 is taken into account, in particular offset.

In the shown examples, the mating tooth structure 30, in particular the respective tooth row 31, extends into the guide section 38, 39 next-adjacent in the longitudinal direction 10, so that the mating tooth structure 30, in particular the tooth row 31, is also arranged in the guide 32, 33, 34, 35. Here, the different thicknesses 40, 41 of the guide sections 38, 39 are realised in the shown examples by a corresponding local thickening of the mating tooth structure 30, in particular a local thickening of the tooth row 31 in the second guide section 39.

The respective valve element 19, 20 is substantially formed plate-like and thus has a plate body 42.

Figure 6:
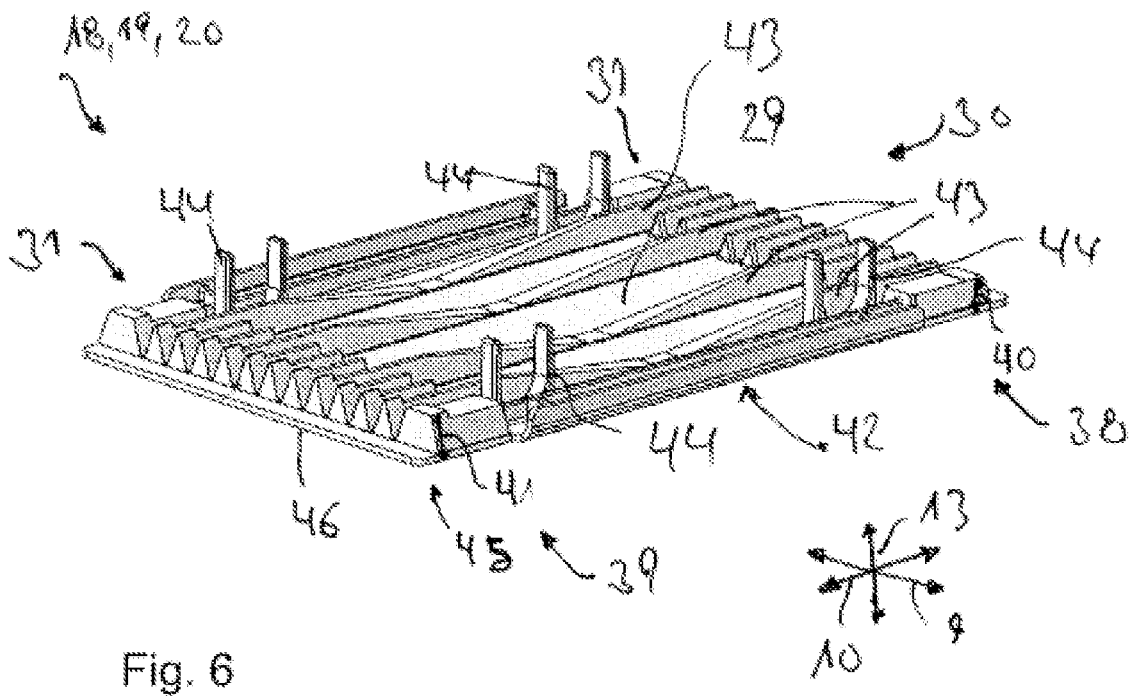
FIG. 6 shows an isometric view of a valve element of the ventilation device in a further exemplary embodiment.
Figure 7:
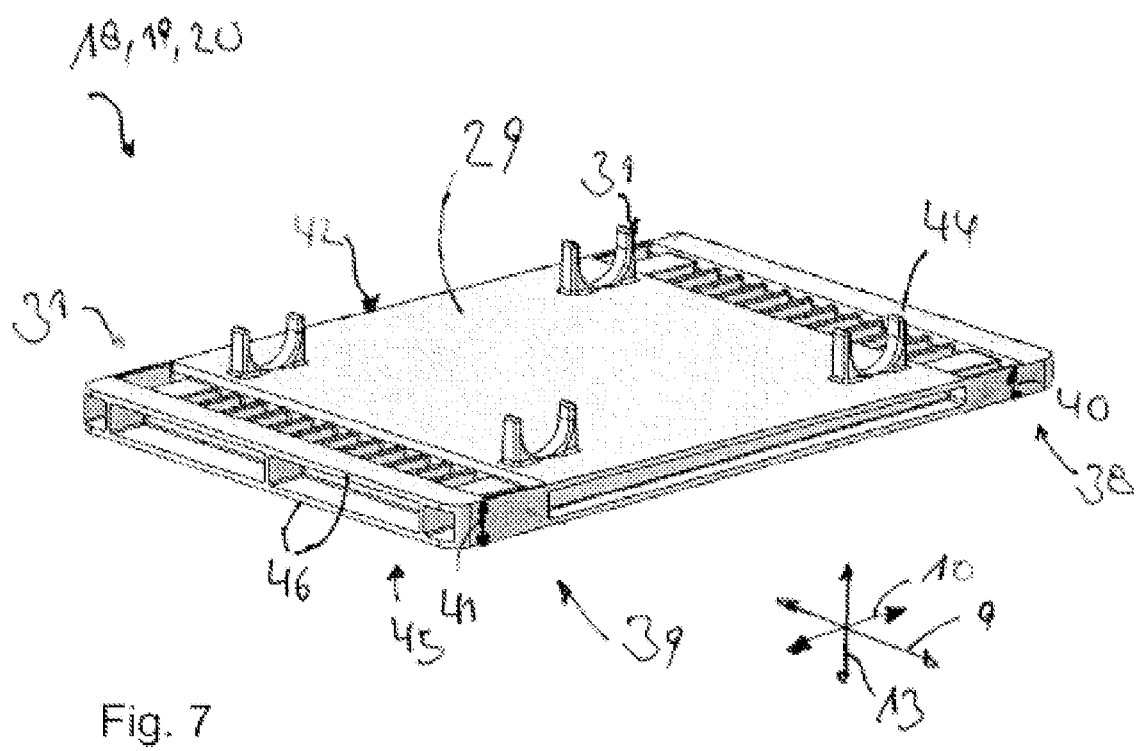
FIG. 7 shows an isometric view of the valve element in another exemplary embodiment.

Here, the FIGS. 2 to 5 as well as 7 show an exemplary embodiment of the valve element 19, 20, FIG. 1 a second exemplary embodiment of the valve element 19, 20 and FIG. 6 a third exemplary embodiment of the valve element 19, 20.

In the exemplary embodiments of the FIGS. 1 to 5 as well as 7, the valve element 19, 20 has a substantially closed surface on the face end 29 between the tooth rows 31.

In the exemplary embodiment of FIG. 1, four ribs 43 projecting in the height direction and extending in the longitudinal direction 10 are provided on the end face 29, wherein each two of the ribs 43 are combined into a rib pair and the rib pairs 43 are spaced apart from one another in the transverse direction 9.

In the exemplary embodiments of the FIGS. 2 to 7, four mounts 44 each are provided on the face end 29, which are spaced apart from one another in the longitudinal direction 10 and transverse direction 9.

In the exemplary embodiment shown in FIG. 6, the face end 29 is additionally formed ribbed and comprises ribs 43 running between the tooth rows 31 in the longitudinal direction 10, which are formed symmetrically in the longitudinal direction 10 in such a manner that centrally in the longitudinal direction 10 they have a minimal height running in the height direction 13.

On their, in the longitudinal direction 10, end-side edges 45, the shown valve elements 19, 20 each have at least one shoulder 46 projecting in the longitudinal direction 10 and running in the transverse direction 9.

In the exemplary embodiment of FIG. 6, a single such shoulder 46 is provided on the respective edge 45, whereas in the exemplary embodiments of the FIGS. 1 to 5 as well as 7 two such shoulders 46 are provided on the respective edge 45, which are arranged opposite in the height direction 13. In addition, the respective shoulder 46 is arranged on the end side of the valve element 19, 20 in the height direction 13. With the respective shoulder 46, the valve element 19, 20 lies against one of the guide walls 36, so that the shoulder 46 when the valve element 19, 20 is subjected to inflow is pressed against one of the associated guide walls 36. Thus, a sealing takes place in the region of the shoulder 46.

In the shown examples, the valve elements 19, 20 of the respective ventilation device 1 are formed as identical parts 18. In addition, the pinion shafts 25, 26 of the respective pinion device 1 shown in the examples are formed as identical parts 18.

Figure 8:
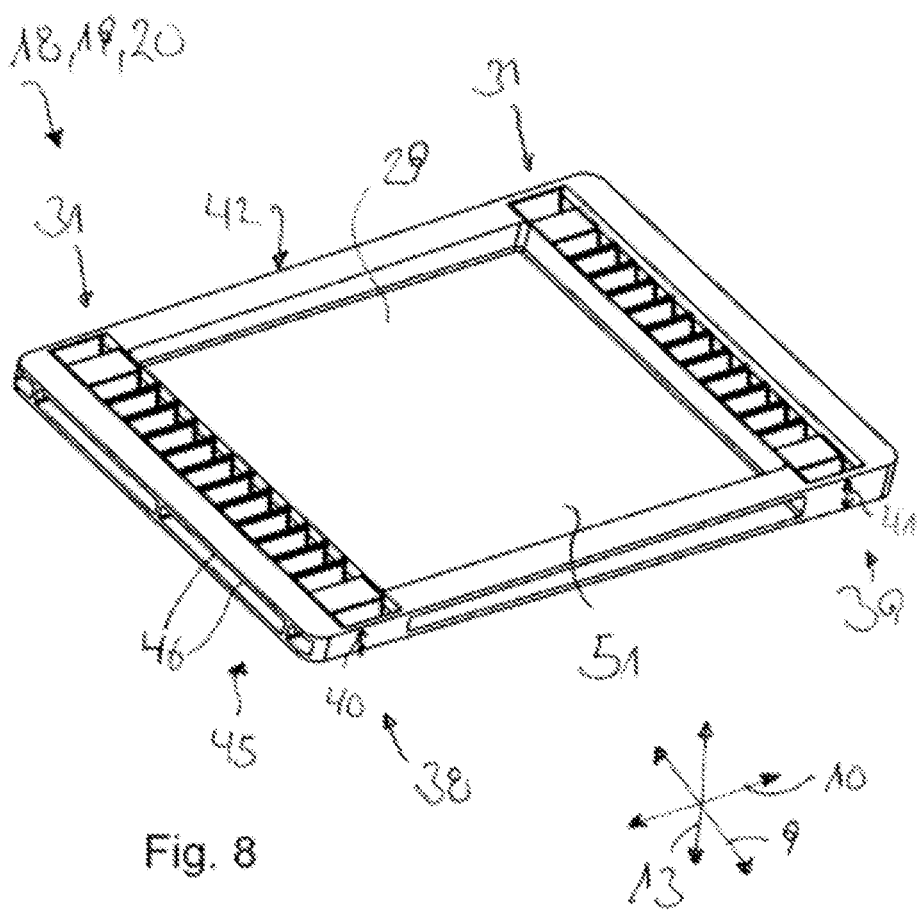
FIG. 8 shows an isometric view of the valve element in a further exemplary embodiment.

FIG. 8 shows a further exemplary embodiment of the valve element 19. This exemplary embodiment differs from the exemplary embodiment shown in FIG. 7 in that the face end 29 of the valve element 19 comprises a central recess 51. In addition, the valve element 19 of FIG. 8 does not have any mounts 44.

The invention claimed is:

1. A ventilation device for a motor vehicle, comprising:
a first supply duct and a second supply duct separate from the first supply duct, which are each flowed through during operation;
a mixing section having a mixing duct into which the first and second supply ducts lead, the first and second supply ducts arranged in the mixing section adjacent one another in a transverse direction;
a first guide and a second guide in the mixing section each running in the transverse direction, the first guide and the second guide located opposite one another in a longitudinal direction running transversely to the transverse direction, each guide having two guide walls running in the transverse direction and located opposite one another in a height direction running transversely to the transverse direction and longitudinal direction, at least one of the guide walls sloping away from the other guide wall at a slope angle with respect to the longitudinal direction;
a valve comprising a plate body, the plate body has a first guide section adjustably guided in the transverse direction in the first guide and has a second guide section adjustably guided in the transverse direction in the second guide; and
an actuator which during the operation adjusts the valve in the transverse direction between a first position, in which the valve fluidically separates the second supply duct from the mixing duct and opens a fluidic connection between the first supply duct and the mixing duct, and a second position, in which the valve fluidically separates the first supply duct from the mixing duct and opens a fluidic connection between the second supply duct and the mixing duct;
wherein the first guide section has a first thickness running in the height direction and which is smaller than a second thickness of the second guide section running in the height direction in such a manner that both guide sections are each in contact with both guide walls of the associated guide.

2. The ventilation device according to claim 1, wherein:
the mixing duct is bounded in the longitudinal direction by a separating wall, in which the second guide is formed;
on the side of the separating wall facing away from the mixing duct, an additional mixing duct is formed, which is bounded in the longitudinal direction by the separating wall;
the first and second supply ducts lead into the additional mixing duct in the mixing section;
in the mixing section, on the side of the separating wall facing away from the mixing duct, a third guide running in the transverse direction and a fourth guide located opposite the third guide in the longitudinal direction and running in the transverse direction are provided;

the third guide and the fourth guide each has two guide walls running in the transverse direction and located opposite one another in the height direction;

at least one of the guide walls of the third guide slopes away with respect to the longitudinal direction from the other guide wall at a slope angle, and at least one of the guide walls of the fourth guide slopes away with respect to the longitudinal direction from the other guide wall at a slope angle;

the ventilation device includes an additional valve comprising a blade body, the blade body has a first guide section adjustably guided in the transverse direction in the fourth guide and has a second guide section adjustably guided in the transverse direction in the third guide;

the actuator, during the operation adjusts the additional valve in the transverse direction between a first position, in which the additional valve fluidically separates the second supply duct from the additional mixing duct and opens a fluidic connection between the first supply duct and the additional mixing duct, and a second position, in which the additional valve fluidically separates the first supply duct from the additional mixing duct and opens a fluidic connection between the second supply duct and the additional mixing duct; and the first guide section of the additional valve has a first thickness running in the height direction, which is smaller than a second thickness of the second guide section of the additional valve running in the height direction, in such a manner that both guide sections of the additional valve are each in contact with both guide walls of the associated guide.

3. The ventilation device according to claim 2, wherein: the mixing duct is bounded by the separating wall and a first assembly that is separate from the separating wall, which comprises two longitudinal walls located opposite in the transverse direction and a transverse wall located opposite the separating wall in the longitudinal direction, wherein the second guide is formed in the transverse wall of the first assembly; and the additional mixing duct is bounded by the separating wall and a second assembly that is separate from the separating wall, which comprises two longitudinal walls located opposite in the transverse direction and a transverse wall located opposite the separating wall in the longitudinal direction, wherein the fourth guide is formed in the transverse wall of the second assembly.

4. The ventilation device according to claim 3, wherein the first assembly and the second assembly are formed mirror-symmetrically.

5. The ventilation device according to claim 2, wherein the valve and the additional valve are formed as identical parts.

6. The ventilation device according to claim 1, wherein: the actuator comprises a pinion shaft with a tooth structure adjacent to the valve in the height direction; and the valve, on a face end facing the pinion shaft in the height direction, comprises a mating tooth structure corresponding to the tooth structure and which is in engagement with the tooth structure.

7. The ventilation device according to claim 6, wherein: the actuator comprises an additional pinion shaft with a tooth structure adjacent to an additional valve in the height direction; and the additional valve, on a face end facing the additional pinion shaft in the height direction, comprises a mating tooth structure corresponding to and in engagement with the tooth structure of the additional pinion shaft.

8. The ventilation device according to claim 7, wherein the pinion shaft and the additional pinion shaft are formed as identical parts.

9. The ventilation device according to claim 8, wherein the pinion shaft and the additional pinion shaft are non-rotatably connected to one another so that the pinion shaft and the additional pinion shaft jointly adjust the valve and the additional valve.

10. The ventilation device according to claim 6, wherein: the pinion shaft comprises two pinions that are spaced apart in the longitudinal direction, which form the tooth structure; and the valve comprises an associated tooth row for each respective pinion.

11. The ventilation device according to claim 6, wherein the mating tooth structure extends in the longitudinal direction into at least one of the first guide section and the second guide section.

12. The ventilation device according to claim 1, wherein the valve, on its end-side edge in the longitudinal direction comprises at least one shoulder projecting in the longitudinal direction and running in the transverse direction, which is in contact with one of the associated guide walls.

13. The ventilation device according to claim 12, wherein on at least one edge of the valve, two shoulders of the at least one shoulder are provided, which are arranged located opposite in the height direction.

14. The ventilation device according to claim 2, wherein: the actuator comprises a pinion shaft with a tooth structure adjacent to the additional valve in the height direction; and the additional valve, on a face end facing the pinion shaft in the height direction, comprises a mating tooth structure corresponding to the tooth structure and which is in engagement with the tooth structure.

15. The ventilation device according to claim 14, wherein: the pinion shaft comprises two pinions that are spaced apart in the longitudinal direction, which form the tooth structure; and the additional valve comprises an associated tooth row for each respective pinion.

16. The ventilation device according to claim 14, wherein the mating tooth structure extends in the longitudinal direction into at least one of the first guide section and the second guide section.

17. The ventilation device according to claim 7, wherein: at least one of the pinion shaft and the additional pinion shaft comprises two pinions that are spaced apart in the longitudinal direction, which form the tooth structure; and the associated valve comprises an associated tooth row for each respective pinion.

18. The ventilation device according to claim 2, wherein at least one of the valve and the additional valve, on its end-side edge in the longitudinal direction comprises at least one shoulder projecting in the longitudinal direction and running in the transverse direction, which is in contact with one of the associated guide walls.

19. The ventilation device according to claim 18, wherein on at least one edge of the respective valve, two shoulders of the at least one shoulder are provided, which are arranged located opposite in the height direction.

20. The ventilation device according to claim 3, wherein the valve and the additional valve are formed as identical parts.

* * * * *